US007569172B2

(12) United States Patent
Pietraszkiewicz et al.

(10) Patent No.: US 7,569,172 B2
(45) Date of Patent: Aug. 4, 2009

(54) METHOD FOR FORMING TURBINE BLADE WITH ANGLED INTERNAL RIBS

(75) Inventors: Edward Pietraszkiewicz, Southington, CT (US); Irwin D. Singer, West Hartford, CT (US); James P. Downs, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 429 days.

(21) Appl. No.: 11/165,476

(22) Filed: Jun. 23, 2005

(65) Prior Publication Data

US 2006/0292005 A1 Dec. 28, 2006

(51) Int. Cl.
*B29C 45/26* (2006.01)
*B29C 45/36* (2006.01)

(52) U.S. Cl. ................. 264/328.2; 264/313; 264/328.1; 425/577

(58) Field of Classification Search ....................... None
See application file for complete search history.

(56) References Cited

U.S. PATENT DOCUMENTS 4,283,835 A * 8/1981 Obrochta et al. ........... 29/527.6
5,547,630 A * 8/1996 Schmidt .................. 264/297.2
6,530,416 B1 * 3/2003 Tiemann ..................... 164/137

* cited by examiner

*Primary Examiner*—Monica A Huson
(74) *Attorney, Agent, or Firm*—Carlson, Gaskey & Olds

(57) ABSTRACT

A die for forming a lost wax ceramic core allows the formation of non-parallel separating spaces between adjacent portions of the core. The core will eventually form cooling channels in an airfoil. The die for forming the core includes a plurality of moving parts having rib extensions. At least some rib extensions are non-parallel to form the non-parallel spaces. The die includes two main die halves that come together to form several of the spaces. Inserts move with those die components and come together to form other spaces. At least one of the inserts contacts surfaces on one of the die halves, such that the non-parallel spaces are formed.

19 Claims, 5 Drawing Sheets

Fig-1A
PRIOR ART
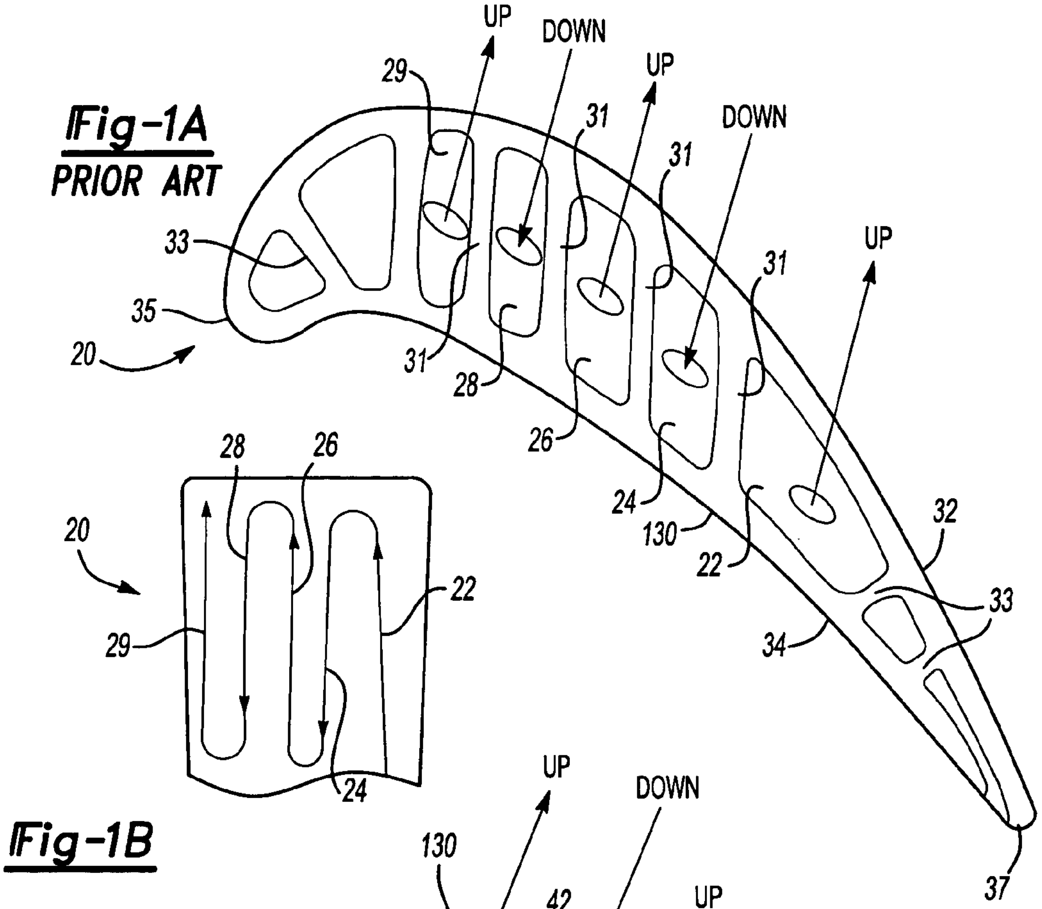
Fig-1B
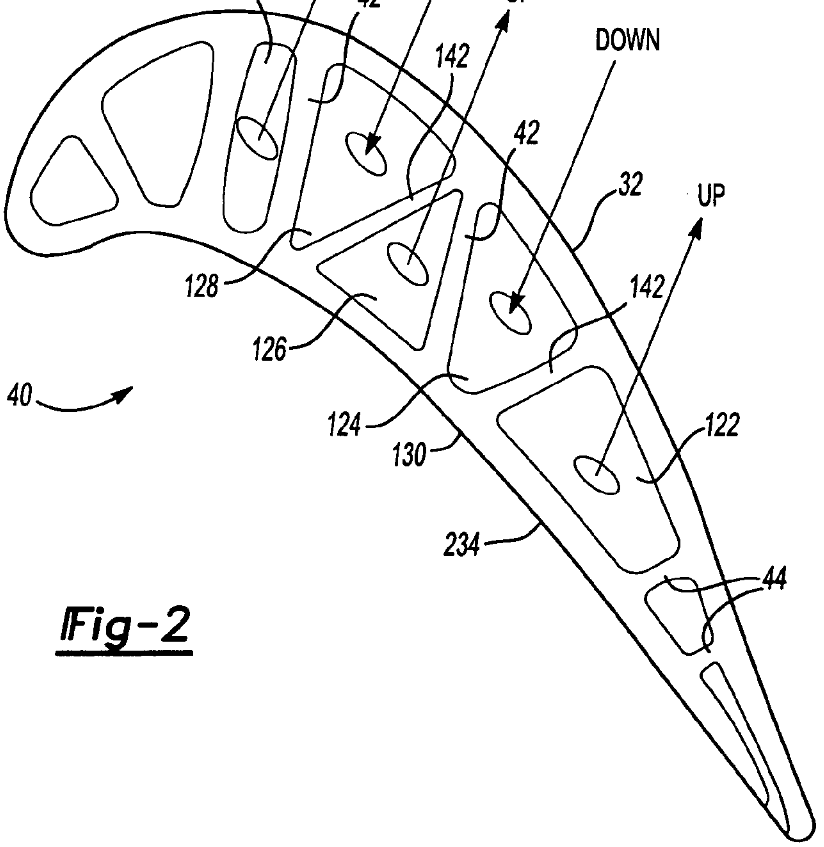
Fig-2

METHOD FOR FORMING TURBINE BLADE WITH ANGLED INTERNAL RIBS

BACKGROUND OF THE INVENTION

This application relates to a method of forming a turbine blade with triangular/trapezoidal serpentine cooling passages with a unique tooling die construction.

Turbine blades are utilized in gas turbine engines. As known, a turbine blade typically includes a platform, with an airfoil shape extending above the platform to the tip. The airfoil is curved, extending from a leading edge to a trailing edge, and between a pressure wall and a suction wall.

Cooling circuits are formed within the airfoil body to circulate cooling fluid, typically air. One type of cooling circuit is a serpentine channel. In a serpentine channel, air flows serially through a plurality of paths, and in opposed directions. Thus, air may initially flow in a first path from a platform of a turbine blade outwardly through the airfoil and reach a position adjacent an end of the airfoil. The flow is then returned in a second path, back in an opposed direction toward the platform. Typically, the flow is again reversed back away from the platform in a third path.

The location and shape of the paths in a serpentine channel has been the subject of much design consideration.

During operation of the gas turbine engine, the cooling air flowing inside the paths is subjected to a rotational force. The interaction of the flow through the paths and this rotational force results in what is known as a Coriolis force which creates internal flow circulation in the paths. Basically, the Coriolis force is proportional to the vector cross product of the velocity vector of the coolant flowing through the passage and the angular velocity vector of the rotating blade. Thus, the Coriolis effect is opposite in adjacent ones of the serpentine channel paths, dependent on whether the air flows away from, or towards, the platform.

To best utilize the currents created by the Coriolis effect, designers of airfoils have determined that the flow channels, and in particular the paths that are part of the serpentine flow path, should have a triangular/trapezoidal shape. Essentially, the Coriolis effect results in there being a primary flow direction within each of the flow channels, and then a return flow on each side of this primary flow. Since the cooling air is flowing in a particular direction, designers in the airfoil art have recognized the heat transfer of a side that will be impacted by this primary direction will be greater than on the opposed side. Thus, trapezoidal shapes have been designed to ensure that a larger side of the cooling channel will be impacted by the primary flow direction.

To form cooling channels, a so-called lost wax molding process is used. Essentially, a ceramic core is initially formed in a tooling die. Wax is placed around that core to form the external contour of the turbine blade. An outer mold, or shell is built up around the wax using a ceramic slurry. The wax is then melted, leaving a space into which liquid metal is injected. The metal is then allowed to solidify and the outer shell is removed. The ceramic core is captured within the metal, forming the blade. A chemical leeching process is utilized to remove the ceramic core, leaving hollows within the metal blade. In this way, the cooling passages in the blade are formed.

There are challenges in forming triangular/trapezoidal cooling channels using existing methods. As shown in FIG. 1A, a standard blade 20 may have a number of cooling passages. One set of cooling paths 22, 24, 26, 28 and 29 is a serpentine cooling circuit. As can be appreciated as for example in FIG. 1B, air flows outwardly and back inwardly within the blade through the serpentine circuit. As shown in FIG. 1A, ribs 31 separate the paths 22, 24, 26, 28 and 29. In the FIG. 1A embodiment, the ribs 31 are all generally parallel to each other. Other ribs 33 are non-parallel to the ribs 31, and include additional cooling passages at both a leading edge 35 and a trailing edge 37. A pressure wall 32 of the blade will face a higher pressure fluid flow when the blade is utilized in a turbine, and a suction wall 130 will face a lower pressure flow.

As mentioned, due to the Coriolis effect, as the blade rotates, the heat transfer characteristics will differ dependent on whether the air is moving outwardly or inwardly relative to the platform.

Thus, as shown in FIG. 2, it has become desirable to form a turbine blade 40 such that the paths 122, 124, 126, 128 and 130 are no longer formed between generally parallel ribs. Instead, the ribs 42 and 142 are generally at non-parallel angles relative to each other and such that the passages are triangular/trapezoidal in section. Similarly, ribs 44 adjacent the trailing edge may also be non-parallel to the ribs 42 and parallel to rib 142.

As shown schematically in FIG. 3, and as mentioned above, to form the turbine blade, a ceramic core C is initially formed in a process that will be described below. The ceramic core C is then placed into a lost wax mold, and the blade D is formed as described above.

The prior art core to make the blade of FIG. 1A is formed by a process shown in FIGS. 4A-4C. As shown, a first die half 50 and a second die half 52 are brought together to define internal passages that receive ceramic material. As shown, the first die half 50 has rib extensions 54 and the second die half 52 has rib extensions 56. Together, the rib extensions 54 and 56 will form a space for ribs 31. Inserts 58 and 59 form the ribs 33 at the leading edge, and inserts 60 and 61 will form the ribs 33 at the trailing edge.

As shown in FIG. 4B, the two die halves 50 and 52 are initially brought together. As can be appreciated, the rib extensions 54 and 56 abut. Spaces 70 will form the portion of the ceramic core that will eventually form the paths in the turbine blade.

As shown in FIG. 4C, the inserts 58 and 59 and 60 and 61 are now brought together. Their extensions 69 also abut. Ceramic may now be injected into the die, and the ceramic core, such as shown in FIG. 3 will then be formed. As seen in FIG. 3, a tie bar T and upper tie bar T connect the spaces 70, although they are not shown in FIGS. 4A-4C.

At the end of formation, the process proceeds in the reverse direction with the inserts 58-59 and 60-61 being moved away from each other, and the die halves 50 and 52 then being moved away from each other, leaving the ceramic core. As can be appreciated, it would be impossible to withdraw the extensions 54 and 56 if they were at an angle that was non-parallel to a direction of movement of the die halves. As such, this prior art molding process cannot be utilized to make the FIG. 2 passages with the non-parallel ribs.

SUMMARY OF THE INVENTION

In the disclosed embodiment of this invention, a die is utilized to form a ceramic core, wherein the ribs are within a serpentine passage are non-parallel to each other. In one method, at least one of a plurality of moving members, which together form a space for forming the ceramic core, have rib extensions that are non-parallel to other of the moving parts.

At least one moving part contacts at least two other moving parts. Also, at least one of the moving parts entirely forms a rib extension on its own, without abutting an extension from another of the moving parts.

In the disclosed embodiment, the insert for forming one of the leading or trailing edges is provided with rib extensions which not only form the ribs adjacent one of the leading or trailing edges, but also forms some of the ribs between the serpentine cooling passages. Thus, there is at least one rib formed between serpentine passages that is parallel to ribs formed adjacent the one of the leading and trailing edges, and other ribs intermediate the two parallel ribs which are non-parallel.

These and other features of the present invention can be best understood from the following specification and drawings, the following of which is a brief description.

BRIEF DESCRIPTION OF THE DRAWINGS

FIG. 1A shows a blade formed by the prior art method.

FIG. 1B shows the flow direction in the prior art serpentine channels.

FIG. 2 shows a blade formed by the present invention.

DETAILED DESCRIPTION OF THE PREFERRED EMBODIMENT

Figure 3:
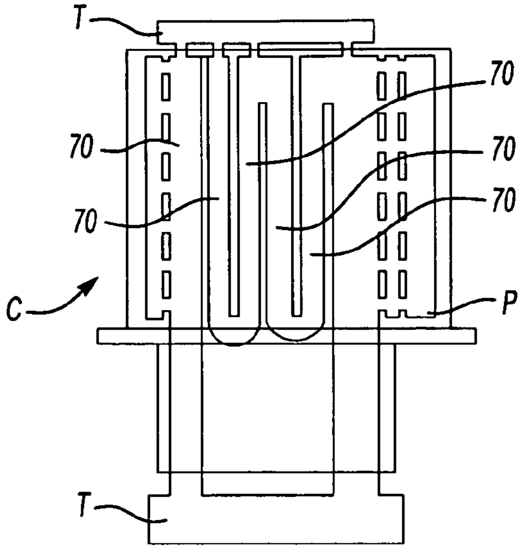
Fig-3 PRIOR ART
FIG. 3 schematically shows the known molding process.
Figure 4A:
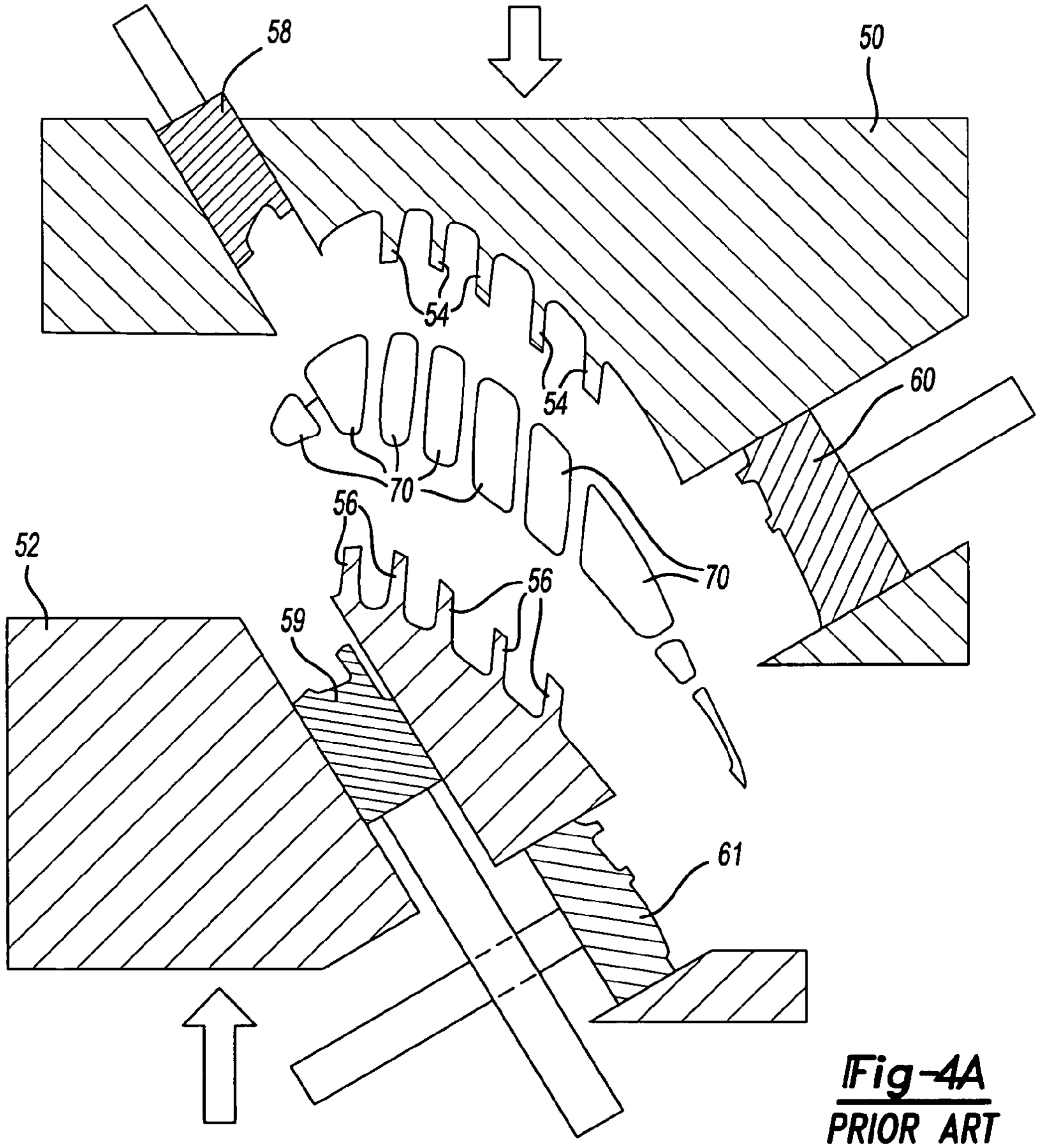
Fig-4A PRIOR ART
FIG. 4A shows a first step in forming the prior art ceramic core.
Figure 4B:
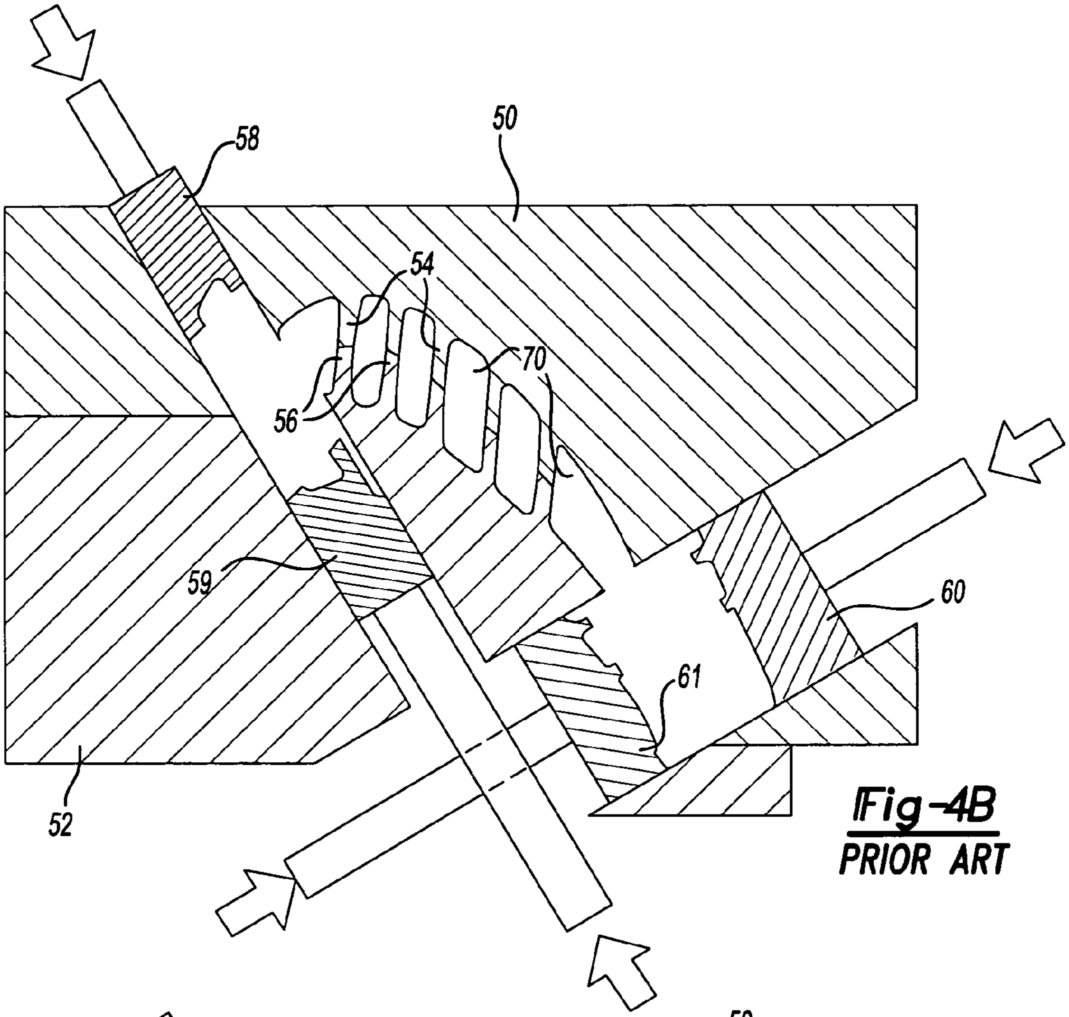
Fig-4B PRIOR ART
FIG. 4B shows a subsequent step.
Figure 4C:
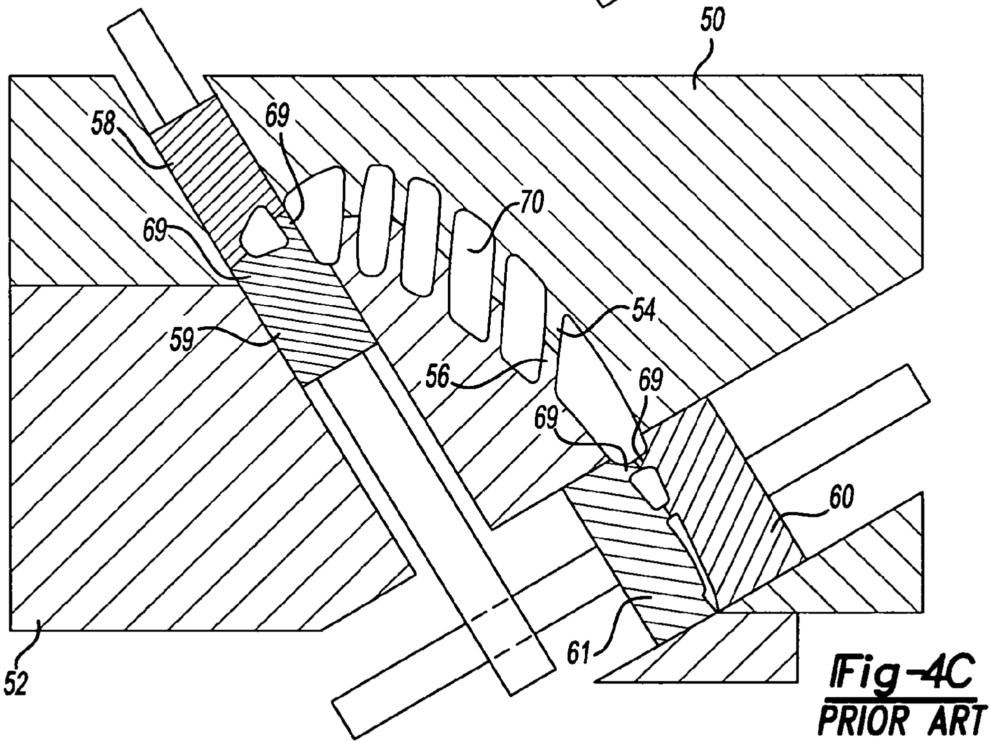
Fig-4C PRIOR ART
FIG. 4C shows another subsequent step.

As can be appreciated from the above, triangular/trapezoidal shaped passages 122, 124, 126, 128 are desirable. However, the die such as shown in prior art FIGS. 4A-4C cannot manufacture the trapezoidal passages in that it cannot manufacture the spaces for non-parallel ribs. Thus, the present invention provides a unique die and method that is tailored to produce the ribs such as are illustrated in FIG. 2.

Figure 5A:
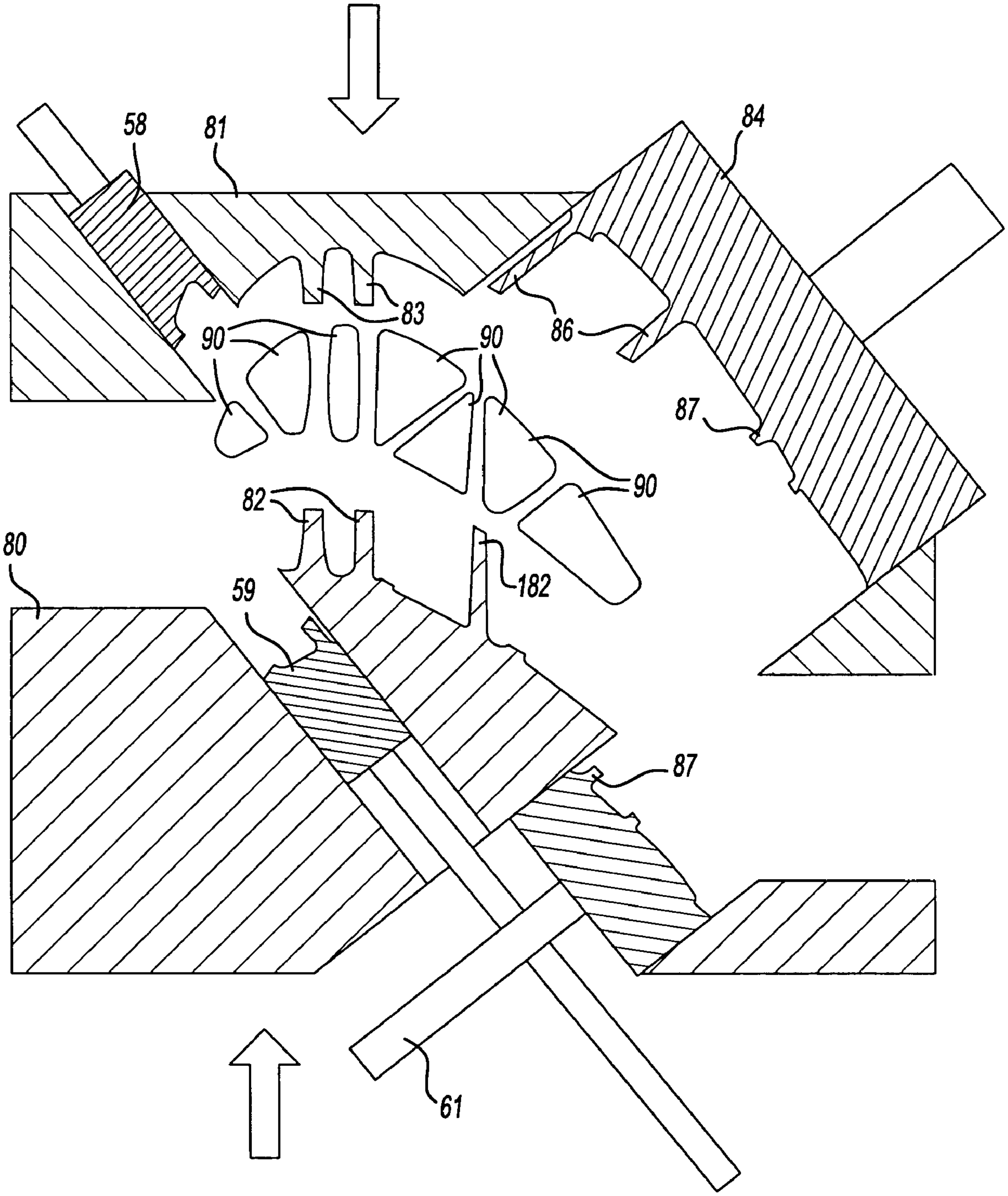
FIG. 5A shows a first step utilizing an inventive die.
Figure 5B:
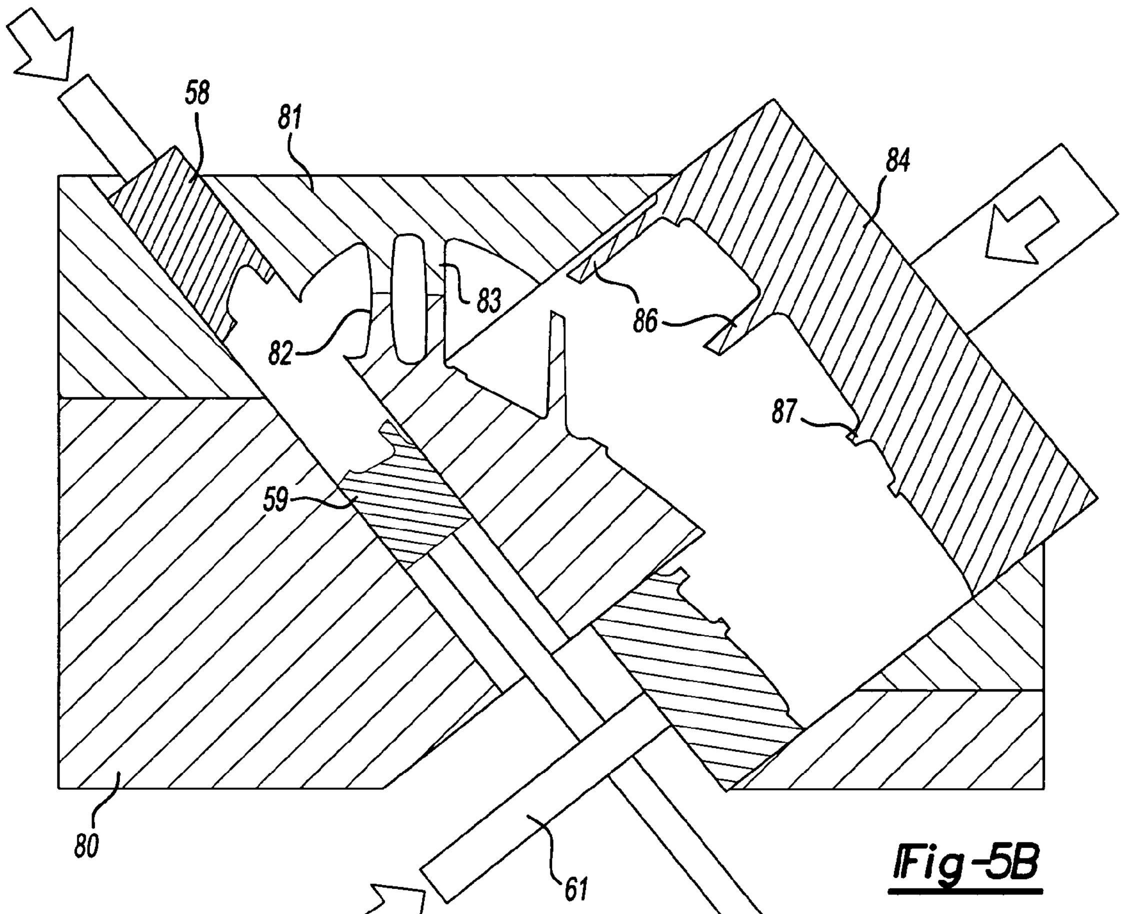
FIG. 5B shows a subsequent step utilizing the inventive die.
Figure 5C:
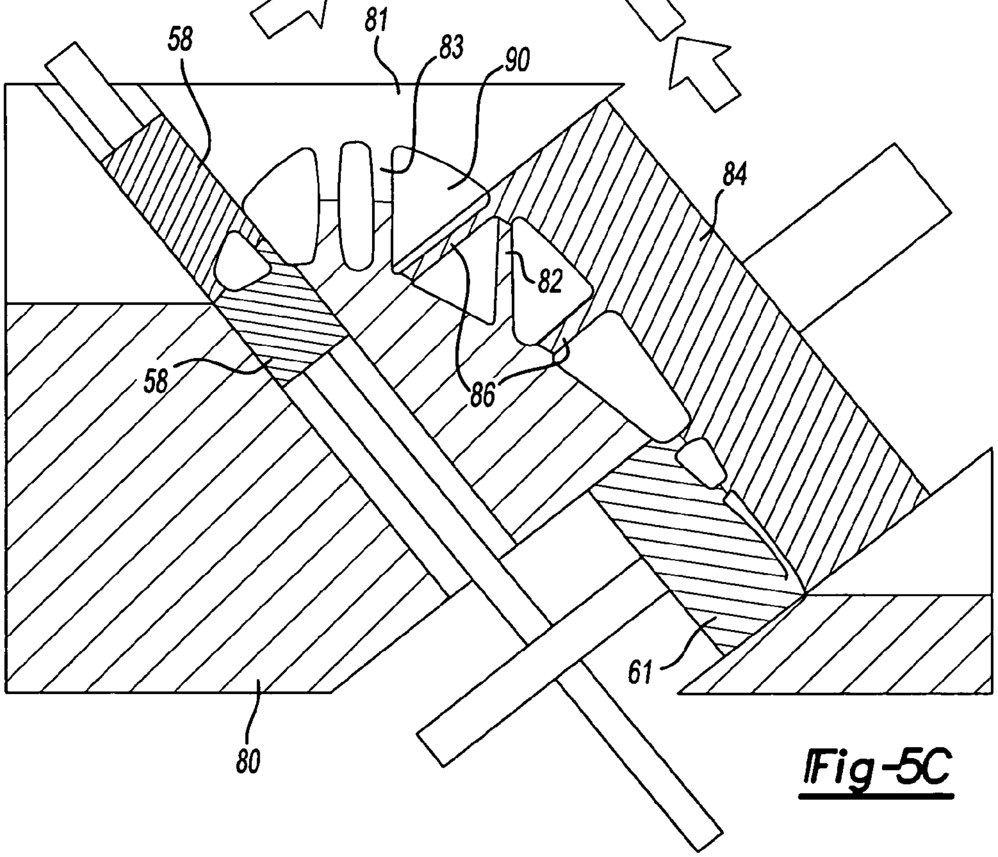
FIG. 5C shows another subsequent step utilizing the inventive die.

The die shown in FIGS. 5A-5C is modified to manufacture the ribs 142 to be parallel to the trailing edge ribs 44. Thus, with this invention, the die halves 80 and 81 have rib extensions 82 and 83 that are not unlike the rib extensions in the prior art. The inserts 58 and 59 may operate identically to form the ribs at the leading edge, and even the insert 61 may be similar. However, the insert 84, which forms the trailing edge ribs through rib extensions 87 with the insert 61, also has rib extensions 86. Rib extensions 86 form ribs such as the ribs 142 (see FIG. 2).

As shown in FIGS. 5B and 5C, the die halves 80 and 81 are brought together. The inserts 58 and 59 and 60 and 84 are then brought together. The rib extensions 86 on the insert 84 will now be in position to form a space for the ribs 142 and 44. The extensions 82 and 83 can form a space for the ribs 42, either by meeting an abutment (the two leftmost ribs), or by being formed entirely with one rib extension (see rib extension 182 on moving die half 80).

As with the prior art, once the core has been formed, the steps are reversed to release the core.

The present invention thus provides a simple method for forming a very complex internal flow passage.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of forming a ceramic core for forming cooling channels within a turbine component comprising the steps of:

(1) providing a die having a plurality of moving parts, said moving parts having rib extensions, (2) bringing at least one of said moving parts into contact with at least two other moving parts, said at least one and said at least two other moving parts having rib extensions, said rib extensions forming solid surfaces within a die cavity, and said solid surfaces including at least two solid surfaces which are non-parallel to each other, (3) injecting a material into said die cavity to form a core.

2. The method as set forth in claim 1, wherein said rib extensions on each of said moving parts are parallel to a direction of movement of the moving part.

3. The method as set forth in claim 1, wherein said moving parts having a plurality of rib extensions.

4. The method as set forth in claim 1, wherein at least some of said rib extensions contacting a surface on another moving part.

5. The method as set forth in claim 4, wherein others of said rib extensions contacting rib extensions on another moving part.

6. The method as set forth in claim 1, wherein said at least two other moving parts moving in non-parallel directions relative to each other.

7. The method as set forth in claim 1, wherein said plurality of moving parts include two die halves, with each of said die halves carrying movable inserts, with said movable inserts on said die halves cooperating to form a trailing edge cooling channel and a leading edge cooling channel.

8. The method as set forth in claim 7, wherein at least one of said movable inserts is said at least one of said moving parts.

9. The method as set forth in claim 8, wherein said at least one of said movable inserts forms a cooling channel at said trailing edge.

10. The method as set forth in claim 1, wherein said turbine component is a turbine blade.

11. The method of claim 1, wherein said core is placed in a lost wax molds, metal is injected around said core, and said core is subsequently leeched to form cooling channels within a turbine component.

12. A method of forming a ceramic core for forming cooling channels within a turbine component comprising the steps of:

(1) providing a die having a plurality of moving parts, said moving parts having rib extensions;

(2) bringing at least one of said moving parts into contact with at least two other moving parts, said rib extensions forming solid surfaces within a die cavity, and said solid surfaces including at least two solid surfaces which are non-parallel to each other;

(3) injecting a material into said die cavity to form a core;

(4) said rib extensions on each of said moving parts formed parallel to a direction of movement of a respective one of the moving parts; and (5) moving said at least two other moving parts in non-parallel directions relative to each other.

13. The method as set forth in claim 12, wherein at least some of said rib extensions contacting a surface on another moving part.

14. The method as set forth in claim 13, wherein others of said rib extensions contacting rib extensions on another moving part.

15. The method as set forth in claim 12, wherein said plurality of moving parts include two die halves, with each of said die halves carrying movable inserts, with said movable inserts on said die halves cooperating to form a trailing edge cooling channel and a leading edge cooling channel.

16. The method as set forth in claim 15, wherein at least one of said movable inserts is said at least one of said moving parts.

17. The method as set forth in claim 16, wherein said at least one of said movable inserts forms a cooling channel at said trailing edge.

18. The method as set forth in claim 12, wherein said turbine component is a turbine blade.

19. The method as set forth in claim 12, wherein said core is placed in a lost wax mold, metal is injected around said core, and said core is subsequently leeched to form cooling channels within a turbine component.

* * * * *

UNITED STATES PATENT AND TRADEMARK OFFICE

CERTIFICATE OF CORRECTION

PATENT NO. : 7,569,172 B2
APPLICATION NO. : 11/165476
DATED : August 4, 2009
INVENTOR(S) : Pietraszkiewicz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this

Seventh Day of September, 2010

David J. Kappos

*Director of the United States Patent and Trademark Office*